United States Patent [19]
Halloran

[11] Patent Number: 6,136,938
[45] Date of Patent: Oct. 24, 2000

[54] SILICONE TERPOLYMERS CONTAINING DIMETHYL HIGHER ALKYL AND REPEATING UNITS

[75] Inventor: Daniel Joseph Halloran, Midland, Mich.

[73] Assignee: Dow Corning Corporation, Midland, Mich.

[21] Appl. No.: 09/262,938

[22] Filed: Mar. 5, 1999

[51] Int. Cl.$^7$ .................................................. C08G 77/08
[52] U.S. Cl. ................................ 528/14; 528/38; 556/425
[58] Field of Search ......................... 528/14, 38; 556/425

[56] References Cited

U.S. PATENT DOCUMENTS

| | | | |
|---|---|---|---|
| 2,868,766 | 1/1959 | Johannson | 260/46.5 |
| 2,947,771 | 8/1960 | Bailey | 260/448.2 |
| 2,994,684 | 8/1961 | Johannson | 260/46.5 |
| 3,002,951 | 10/1961 | Johannson | 260/46.5 |
| 4,036,868 | 7/1977 | Atherton | 260/448.2 |
| 4,844,888 | 7/1989 | Zawadski | 429/69 |
| 5,064,544 | 11/1991 | Lin et al. | 252/88 |
| 5,075,403 | 12/1991 | Kirk | 528/15 |
| 5,077,421 | 12/1991 | Selvig | 556/425 |
| 5,707,434 | 1/1998 | Halloran et al. | 106/287.11 |

Primary Examiner—Margaret G. Moore
Attorney, Agent, or Firm—James L. De Cesare

[57] ABSTRACT

Silicone terpolymers and a method of making a silicone terpolymer of the formula:

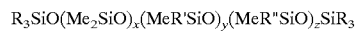

$$R_3SiO(Me_2SiO)_x(MeR'SiO)_y(MeR''SiO)_zSiR_3$$

in which R is a C1–C4 alkyl group; Me represents a methyl group: R' is at least a $C_8$ containing alkyl group; R" is an aminoalkyl group such as

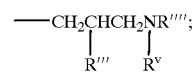

$$-CH_2CHCH_2NR'''';$$
$$\quad\;\;|\quad\;\;\;|$$
$$\quad R'''\;\;\;R^V$$

x, y, and z are each 1–1000; R''' and R'''' are H or methyl; $R^V$ is H or a group such as

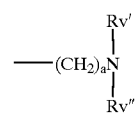

$$-(CH_2)_aN\begin{matrix}Rv'\\|\\Rv''\end{matrix}$$

where a is 2 or 3, Rv' is H or methyl, and Rv" is H.

10 Claims, No Drawings

SILICONE TERPOLYMERS CONTAINING DIMETHYL HIGHER ALKYL AND REPEATING UNITS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to polyorganosiloxanes containing three different types of difunctional "D" units $R_2SiO_{2/2}$. In particular, the polyorganosiloxanes according to the invention are terpolymers with (i) dimethyl, (ii) higher alkylmethyl, and (iii) aminoalkyl containing "D" units.

BACKGROUND OF THE INVENTION

The inventor herein is not aware of any public document that describes a silicone terpolymer having a dimethyl functional "D" unit, a methyl and a higher alkyl functional group containing "D" unit in which the higher alkyl group has at least 8 or more carbon atoms, and a methyl and aminoalkyl functional group containing "D" unit; or a method for preparing such terpolymeric silicones.

While Zawadski in her U.S. Pat. No. 4,844,888 (Jul. 4, 1989) describes what she classifies as a "Type II" polysiloxane, which includes a first "D" unit that can be either a dimethyl functional "D" unit or a methyl and higher alkyl functional group containing "D" unit, and a second "D" unit which is a methyl and aminoalkyl functional group containing "D" unit, the third or remaining "D" unit in Zawadski's "Type II" polysiloxane must contain a hydrolyzable group such as OH or OR.

Thus, group C in Zawadski is curable by hydrolysis to form branched and cross-linked polymers and such materials are solid film formers. In contrast, no corresponding hydrolyzable group is present in any "D" unit in the terpolymers according to the present invention. The absence of such a group allows for the provision herein of a silicone terpolymer which is a fluid rather than a solid film former as in Zawadski.

This enables terpolymers to be provided which not only are new, but which exhibit improved lubrication and film forming properties which can be invaluable for hair care and fiber treatment applications.

BRIEF SUMMARY OF THE INVENTION

This invention relates to a method of preparing a silicone terpolymer by heating a mixture of (i) a $C_8$ or more carbon atom containing alkylmethyl, dimethyl silicone co-cyclic monomer, and (ii) an aminoalkylsiloxane homopolymer, in the presence of (iii) an alkaline catalyst, at a temperature and for a time sufficient to cause copolymerization of the monomer and the homopolymer to the desired silicone terpolymer. The mixture can include as optional ingredients (iv) a short chain linear silicone endblocking monomer, and (v) a dimethyl cyclosiloxane monomer.

The invention also relates to the silicone terpolymer prepared according to this method. The silicone terpolymer is a composition having the formula:

$$R_3SiO(Me_2SiO)_x(MeR'SiO)_y(MeR''SiO)_zSiR_3$$

wherein R is an alkyl group containing one to four carbon atoms; Me represents a methyl group; R' is an alkyl group containing at least 8 carbon atoms; R" is an aminoalkyl group represented by

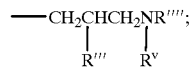

x, y, and z each have a value of 1–1000; R'" and R"" are hydrogen or a methyl group; $R^v$ is hydrogen or the group

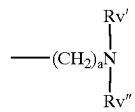

in which a is 2 or 3; Rv' is hydrogen or a methyl group; and Rv" is hydrogen.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

In this invention, new higher alkylmethyl, dimethyl, aminoalkyl functional silicone terpolymers are described which can provide an improvement when they are used in the treatment of fiber, for example, by rendering a softer or smoother feel to fibers to which the silicone terpolymer is applied.

These higher alkylmethyl, dimethyl, aminoalkyl functional silicone terpolymers can be prepared from (i) a $C_8$ or more carbon atom containing alkylmethyl, dimethyl silicone co-cyclic monomer; (ii) an aminoalkylsiloxane homopolymer; and (iii) an alkaline catalyst. As noted above, optional ingredients such as (iv) a short chain linear silicone endblocking monomer, and (v) a dimethyl cyclosiloxane monomer, can also be used in their preparation.

The $C_8$ or more carbon atom containing alkylmethyl, dimethyl silicone co-cyclic monomer (i), and the aminoalkylsiloxane homopolymer (ii) are described below in the description of a General Procedure used in the examples.

The catalyst (iii) used in the method according to the invention can be an alkali-metal silanolate having the formula $R^a_wSi(OM)_{4-w}$ or an alkali metal siloxanolate of the formula $MO(R^a_2SiO)_nM$. In these formulas, $R^a$ represents an alkyl radical of 1–6 carbon atoms, an aryl radical, an alkenyl radical, or an alkylamino radical; w is 0–3; and r is 2–20.

Some examples of suitable alkyl and aryl radicals $R^a$ are methyl, ethyl, and phenyl. Some examples of suitable alkenyl radicals $R^a$ are vinyl, allyl, propenyl, and hexenyl. Some examples of suitable aminoalkyl radicals $R^a$ are aminopropyl and ethylene diaminopropyl. M represents an alkali metal in Group IA of the Periodic Table such as lithium, sodium, potassium, rubidium, and cesium. Sodium and potassium are the preferred alkali metals, however.

Generally, it has been found that as the value of n increases, so does the likelihood of alkali metal siloxanolates being soluble in organic solvents, hence the preference herein is for the use of alkali metal silanolates. Where it is desired to employ an alkali metal siloxanolate, however, the value of n is preferably selected to be in the range of about 2–10, most preferably in the range of about 3–6.

Examples of some suitable alkali metal silanolates and alkali metal siloxanolates are sodium trimethylsilanolate $(CH_3)_3Si(ONa)$, sodium triphenylsilanolate $(C_6H_5)_3Si(ONa)$, disodium diphenylsilanolate $(C_6H_5)_2Si(ONa)_2$, disodium dimethylsilanolate $(CH_3)_2Si(ONa)_2$, disodium methylaminopropylsilanolate $(CH_3)[H_2NCH_2CH_2CH_2]Si(ONa)_2$, their potassium equivalents, dipotassium dimethylsilanolate $KO[(CH_3)_2SiO]K$, dipotassium dimethylsiloxanolate $KO[(CH_3)_2SiO]_nK$ where n is 4–8, dipotassium phenylmethylsilanolate $KO[(C_6H_5)(CH_3)SiO]K$, and dipotassium phenylmethylsiloxanolate $KO[(C_6H_5)(CH_3)SiO]_nK$ where n is 4–8.

Such alkali metal silanolates and alkali metal siloxanolates can be obtained by various methods known in the art, and several processes for their preparation are set forth in detail in U.S. Pat. No. 5,629,401 (May 13, 1997) and U.S. Pat. No. 5,637,668 (Jun. 10, 1997), incorporated herein by reference.

The preferred catalyst is an alkali metal silanolate, and more particularly, dipotassium dimethylsilanolate. This well-defined salt is shown below:

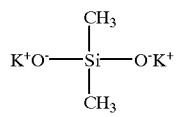

This, however, does not preclude the use of other alkali metal silanolates and alkali metal siloxanolates. One example of a suitable alkali metal organosiloxanolate which can be used is a dipotassium dimethylsiloxanolate salt corresponding to the formula shown below, in which n is preferably about 4 to about 8.

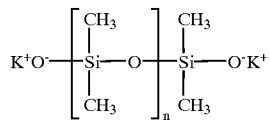

A fourth and optional ingredient which can be included is (iv) a short chain linear silicone endblocking monomer of the type $MD_eM$, wherein "e" generally has a value of from 0 to about 8; "M" represents monofunctional unit $(CH_3)_3SiO_{1/2}$; and "D" represents difunctional unit $(CH_3)_2SiO_{2/2}$. This fourth optional component can be any one or more of linear volatile methyl siloxanes such as hexamethyldisiloxane (MM) with a boiling point of 100° C., viscosity of 0.65 $mm^2/s$, and formula $Me_3SiOSiMe_3$; octamethyltrisiloxane (MDM) with a boiling point of 152° C., viscosity of 1.04 $mm^2/s$, and formula $Me_3SiOMe_2SiOSiMe_3$; decamethyltetrasiloxane ($MD_2M$) with a boiling point of 194° C., viscosity of 1.53 $mm^2/s$, and formula $Me_3SiO(Me_2SiO)_2SiMe_3$; dodecamethylpentasiloxane ($MD_3M$) with a boiling point of 229° C., viscosity of 2.06 $mm^2/s$, and formula $Me_3SiO(Me_2SiO)_3SiMe_3$; tetradecamethylhexasiloxane ($MD_4M$) with a boiling point of 245° C., viscosity of 2.63 $mm^2/s$, and formula $Me_3SiO(Me_2SiO)_4SiMe_3$; and hexadecamethylheptasiloxane ($MD_5M$) with a boiling point of 270° C., viscosity of 3.24 $mm^2/s$, and formula $Me_3SiO(Me_2SiO)_5SiMe_3$.

A fifth and optional ingredient is (v) a dimethyl cyclosiloxane monomer. This fifth optional component can be any one or more of cyclic volatile methyl siloxanes such as hexamethylcyclotrisiloxane ($D_3$) a solid with a boiling point of 134° C. and formula $\{(Me_2)SiO\}_3$; octamethylcyclotetrasiloxane ($D_4$) with a boiling point of 176° C., viscosity of 2.3 $mm^2/s$, and formula $\{(Me_2)SiO\}_4$; decamethylcyclopentasiloxane ($D_5$) with a boiling point of 210° C., viscosity of 3.87 $mm^2/s$, and formula $\{(Me_2)SiO\}_5$; and dodecamethylcyclohexasiloxane ($D_6$) with a boiling point of 245° C., viscosity of 6.62 $mm^2/s$, and formula $\{(Me_2)SiO\}_6$.

The improvement of the method according to this invention resides in the inclusion of the co-cyclic monomer (i) as one of the components of the polymerization reaction. In this regard, it should be noted that higher alkylmethyl homocyclic monomers cannot generally be used to make silicone terpolymers of the type described herein. This is because of the fact that linear structures derived from such monomers revert spontaneously back to homocyclic species.

The silicone terpolymers according to this invention can be generally represented by the formula:

wherein R is a $C_1$ to $C_4$ alkyl group; Me represents a methyl group; R' is at least a $C_8$ or more containing alkyl group; R" is an aminoalkyl group of the type

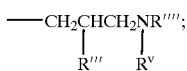

and x, y, and z each have a value of 1–1000.

Preferably R is a methyl group; R' is a $C_8$ to $C_{30}$ carbon atom containing alkyl group; R''' and R'''' are hydrogen or the methyl group; $R^v$ is hydrogen or a group represented by

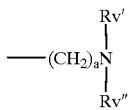

in which a is 2 or 3, Rv' is hydrogen or a methyl group, and Rv" is hydrogen; x has a value of 1 to 500; y has a value of 1 to 100; and z has a value of 1 to 50.

These new silicone terpolymers are linear in structure, which is defined according to this invention as being a structure containing monofunctional "M" units; $(CH_3)_3SiO_{1/2}$ and difunctional "D" units $(CH_3)_2SiO_{2/2}$. The silicone terpolymers are not believed to contain any significant portion of trifunctional "T" units $CH_3SiO_{3/2}$ or tetrafunctional "Q" units $SiO_{4/2}$.

In addition, the new silicone terpolymers can be characterized as being non-reactive, in the sense that they contain no units of the type $ROSi\equiv$ where R represents hydrogen or alkyl. Further, the silicone terpolymers are characteristically aminoalkyl functional polymers, in contrast to materials classified as being quaternary ammonium type $[R4N^+]Z^-$.

What is believed to be particularly unique about the construction of these new silicone terpolymers is that they contain in the same molecule or polymer chain, an alkyl group with 8 or more carbon atoms bonded to a silicon atom, as well as an amine functional group bonded to a silicon atom.

Except for the use of a co-cyclic siloxane monomer, the method of preparing silicone terpolymers according to the present invention, is generally known in the prior art. Thus, U.S. Pat. No. 2,868,766 (Jan. 13, 1959); U.S. Pat. No. 2,994,684 (Aug. 1, 1961); and U.S. Pat. No. 3,002,951 (Oct. 3, 1961); all of which are assigned to the same assignee as the present invention, relate to methods of making various types of polymers by polymerizing and copolymerizing cyclic type siloxane species at elevated temperatures, in the presence of a catalyst, for a time sufficient to obtain the desired state of polymerization to polymers of essentially linear construction, i.e., the anionic ring opening polymerization mechanism.

As the method herein does not differ significantly from such methods, except for the presence of the co-cyclic siloxane monomer, reference may be had to these three U.S. patents for the general conditions needed to carry out the process.

Thus, for example, polymerization of the co-cyclic siloxane can be carried out at a temperature ranging from 30 to 250° C. for a time ranging from 5 minutes to three days. Generally, polymerization can be accelerated by increasing the reaction temperature.

The amount of the catalyst can be from about one alkali ion per 100 silicon atoms to one alkali ion per 200,000 silicon atoms. While polymerization can be achieved by using more or less than these amounts of an alkali, this is not practical, as in the one case excessive amounts of acid would be required for neutralization of the catalyst at the end of the reaction, while in the other case, trace amounts of an acidic impurity could hinder the effectiveness of the catalyst in the initial reaction. Generally, a weak acid such as acetic acid is used to deactivate the catalyst.

While it is preferred to carry out the reaction in the absence of a solvent, the reaction can be conducted in the presence of solvents such as acetonitrile, dimethylformamide, decahydronaphthalene, toluene, p-chloro-toluene, o-dichloro-benzene, tetrahydrofuran, xylene, dimethyl sulfoxide, or dibutyl ether, if desired.

Essential and optional monomeric components of the polymerization reaction can be combined in stoichiometric quantities or a slight excess, that is necessary to achieve the desired distribution of repeating units in the polymer chain of the silicone terpolymer. Thus, equivalent amounts of reactants should be employed in the process, although it may be necessary to use an excess of one or more of the reactants. The maximum amount is determined, for example, by economical considerations, as there is no benefit in employing an excess of a reactant that is not consumed. The minimum amount will depend on the type and purity of the reactants.

EXAMPLES

The following examples are set forth in order to illustrate the invention in more detail. In the three examples, a silicone terpolymer was prepared having a structure generally corresponding to the formula:

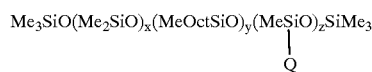

wherein Me represents the methyl group, Oct represents the octyl group $CH_3(CH_2)_7$—, and Q represents the group —$CH_2CH_2CH_2NHCH_2CH_2NH_2$. The values represented by x, y, and z, for the three silicone terpolymers prepared in Examples 1, 2, and 3, are shown below in Table 1.

TABLE 1

| Example | x | y | z | Mw | Mn | D | Viscosity | % NV |
|---|---|---|---|---|---|---|---|---|
| 1 | 301 | 98 | 8 | 17960 | 6660 | 2.7 | 1150 mm²/s | 86.4 |
| 2 | 350 | 40 | 8 | — | — | — | 1860 mm²/s | 85.3 |
| 3 | 6 | 1 | 1 | — | — | — | 19 mm²/s | 79.9 |

Examples 1 to 3

A General Procedure

Into a reaction vessel was placed the first optional ingredient which is the endblocking silicone. Either decamethyltetrasiloxane ($MD_2M$) or eicosamethylnonasiloxane ($MD_7M$) were used in Examples 1–3. To the reaction vessel was then added the second optional ingredient which is the cyclic silicone to be copolymerized. Octamethylcyclotetrasiloxane ($D_4$) was the cyclic silicone used in Examples 1–3. These two reactants, while being classified as being optional ingredients according to this invention, are generally preferred to be included as components of the reaction medium.

The first essential ingredient added to the reaction vessel is the co-cyclic siloxane to be copolymerized. The co-cyclic siloxane used in Examples 1–3 had a structure generally corresponding to the formula:

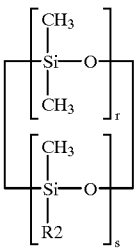

where r and s represent integers each having a value of 1–10, and R2 represents a higher carbon atom containing group such as —$(CH_2)_7CH_3$, —$(CH_2)_{11}CH_3$, or —$(CH_2)_{15}CH_3$. R2 it is noted may contain more than sixteen carbon atoms, if desired.

The second essential ingredient added to the reaction vessel is the aminoalkylsiloxane homopolymer to be copolymerized. In Examples 1–3, the aminoalkylsiloxane homopolymer used consisted of a mixture of linear and cyclic species. The species had a structure generally corresponding to the formulas:

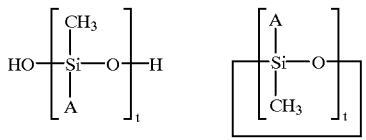

wherein t represents an integer having a value of 1–20, and A represents the group —$CH_2CH_2CH_2NHCH_2CH_2NH_2$ or the group —$CH_2CH(CH_3)CH_2NHCH_2CH_2NH_2$.

The third essential ingredient added to the reaction vessel was the catalyst. The catalyst used in Examples 1–3 was potassium silanolate.

The particular amounts of ingredients used in Examples 1–3 is shown in Table 2. According to the general procedure, the reaction vessel containing these ingredients is purged with nitrogen, and then heated to about 150° C. for about 4–6 hours. The reaction vessel is allowed to cool to less than about 50° C., and then the contents of the reaction vessel are neutralized with acetic acid. Following neutralization, and as an optional step of the process, the contents of the reaction vessel can be filtered.

TABLE 2

| Ingredient(s) | Amount in Grams | | |
| --- | --- | --- | --- |
|  | Example 1 | Example 2 | Example 3 |
| Silicone Endblocker | 1.67 | 2.02 | 33.10 |
| Cyclic Silicone | 0.00 | 48.20 | 7.92 |
| Co-Cyclic Siloxane | 95.24 | 46.03 | 42.00 |
| Aminoalkylsiloxane | 3.19 | 3.84 | 17.29 |
| Catalyst | 0.74 | 0.75 | 0.73 |

In Table 1, NV refers to the non-volatile content of the silicone terpolymer. The silicone terpolymer was characterized, and is shown in Table 1, in terms of its viscosity, as well as in terms of its polydispersity D.

In this regard, it is noted that the molecular weights of silicone fluids with a viscosity less than 5 mm²/s at 77° F./25° C. are generally quite precise, since such fluids are generally fractionally distilled products and relatively pure molecular species. Above about 5 mm²/s, however, molecular weights are average values (i.e., $M_w$), since the fluids are residue products, and therefore contain a distribution of molecular sizes.

The molecular weight distribution of a polymeric sample describes the relative numbers of molecules of all molecular weight values. Averages of molecular weight such as the number-average molecular weight $M_n$, the weight-average molecular weight $M_w$, and the Z-average molecular weight $M_z$, are parameters most commonly used to describe the general shape of the molecular weight distribution. A peak weight-average molecular weight $M_w$ or $M_p$ is another parameter commonly used. One convenient measure of molecular weight distribution in a polymer is the ratio of its weight-average molecular weight $M_w$ to its number-average molecular weight $M_n$, i.e., $M_w/M_n$ or the polydispersity D of the polymer. Generally, for perfectly uniform monodisperse polymers, the ratio is one.

Methods for measuring molecular weight distribution and molecular weight averages for silicones are the same as for other polymers. Gel Permeation Chromatography (GPC), sometimes termed size exclusion chromatography, is the most common, convenient, and useful method. This technique is based on separation of polymer molecules in a column packed with porous cross-linked gels, typically polystyrene, according to their size in solution.

Thus, when a polymer solution is eluted, species of higher molecular weight which permeate the porous polystyrene gel to a lesser degree than species of lower molecular weight, pass through the column more rapidly, and hence are eluted first. The system is calibrated and yields an estimated molecular weight distribution for a given sample. The only requirements are that the sample is soluble and stable in a suitable solvent, and that the sample components can be detected in the eluent by some means.

The system is calibrated by injecting dilute solutions of narrow dispersity standards of a known molecular weight. The retention volume or retention time of each standard is then plotted against the log molecular height of the standard, and fitted to an equation for a curve. The molecular weight distribution values of a given polymer are then calculated and expressed as relative to that standard.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of preparing a silicone terpolymer comprising heating a mixture of (i) a $C_8$ or more carbon atom containing alkylmethyl, dimethyl silicone co-cyclic monomer, and (ii) an aminoalkylsiloxane homopolymer, in the presence of an alkaline catalyst, at a temperature and for a time sufficient to cause copolymerization of the monomer and the homopolymer to the desired silicone terpolymer.

2. A method according to claim 1 in which the mixture further includes (iii) a dimethylcyclosiloxane monomer.

3. A method according to claim 2 in which the mixture further includes (iv) a short chain linear silicone endblocking monomer.

4. A method according to claim 1 in which the catalyst is an alkali-metal silanolate having the formula $R^a_w Si(OM)_{4-w}$ or an alkali metal siloxanolate having the formula $MO(R^a_2 SiO)_n M$, in which $R^a$ represents an alkyl radical of 1–6 carbon atoms, an aryl radical, an alkenyl radical, or an alkylamino radical; w is 0–3; and n is 2–20.

5. A method according to claim 1 in which the $C_8$ or more carbon atom containing alkylmethyl, dimethyl silicone co-cyclic monomer has a structure corresponding to the formula:

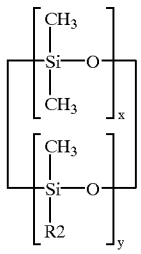

where x and y are integers having a value of 1 to about 10; and R2 is $-(CH_2)_7CH_3$, $-(CH_2)_{11}CH_3$, or $-(CH_2)_{15}CH_3$.

6. A method according to claim 1 in which the aminoalkylsiloxane homopolymer is a mixture of linear and cyclic species with a structure corresponding to the formulas:

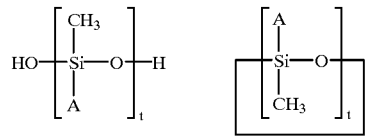

wherein t represents an integer having a value of 1 to about 20; and A represents the group $-CH_2CH(CH_3)CH_2NHCH_2CH_2NH_2$ or the group $-CH_2CH_2CH_2NHCH_2CH_2NH_2$.

7. A silicone terpolymer prepared according to the method defined in claim 1.

8. A composition comprising a silicone terpolymer having the formula:

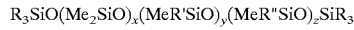

wherein R is an alkyl group containing one to four carbon atoms; Me represents a methyl group; R' is an alkyl group containing at least 8 carbon atoms; R" is an aminoalkyl group represented by

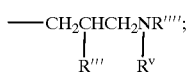
x, y, and z each have a value of 1–1000; R''' and R'''' are hydrogen or a methyl group; $R^v$ is hydrogen or the group
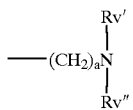
in which a is 2 or 3; $Rv'$ is hydrogen or a methyl group; and $Rv''$ is hydrogen.
9. A composition according to claim 8 in which the R' is —$(CH_2)_7CH_3$, —$(CH_2)_{11}CH_3$, or —$(CH_2)_{15}CH_3$.
10. A composition according to claim 8 in which x has a value of 1 to 500; y has a value of 1 to 100; and z has a value of 1 to 50.
* * * * *